(12) United States Patent
Mei et al.

(10) Patent No.: US 12,389,078 B2
(45) Date of Patent: Aug. 12, 2025

(54) BULLET-SCREEN-COMMENT-BASED CHECK-IN IMPLEMENTATION AND CREATION

(71) Applicant: Shanghai Bilibili Technology Co., Ltd., Shanghai (CN)

(72) Inventors: Yicong Mei, Shanghai (CN); Guojia Chen, Shanghai (CN); Lei Cao, Shanghai (CN); Tao Zeng, Shanghai (CN); Jianqiang Zhang, Shanghai (CN)

(73) Assignee: Shanghai Bilibili Technology Co., Ltd., Shanghai (CN)

( * ) Notice: Subject to any disclaimer, the term of this patent is extended or adjusted under 35 U.S.C. 154(b) by 305 days.

(21) Appl. No.: 18/114,600

(22) Filed: Feb. 27, 2023

(65) Prior Publication Data
US 2023/0276103 A1    Aug. 31, 2023

(30) Foreign Application Priority Data
Feb. 28, 2022    (CN) .......................... 202210185723.8

(51) Int. Cl.
*H04N 21/4788*    (2011.01)
*H04N 21/431*    (2011.01)
*H04N 21/472*    (2011.01)

(52) U.S. Cl.
CPC ..... *H04N 21/4788* (2013.01); *H04N 21/4312* (2013.01); *H04N 21/47217* (2013.01)

(58) Field of Classification Search
USPC .......................................................... 725/34
See application file for complete search history.

(56) References Cited

U.S. PATENT DOCUMENTS

| | | | |
|---|---|---|---|
| 2015/0185967 A1* | 7/2015 | Ly .......................... | G06F 3/0488 715/720 |
| 2017/0185596 A1* | 6/2017 | Spirer ................... | G06F 40/134 |
| 2017/0195720 A1* | 7/2017 | Zuo ..................... | H04N 21/8133 |
| 2018/0007442 A1* | 1/2018 | Peng ................. | H04N 21/26225 |
| 2021/0076106 A1* | 3/2021 | Marten ............ | H04N 21/44008 |
| 2022/0021927 A1* | 1/2022 | Liang ................... | H04N 21/858 |
| 2022/0078492 A1* | 3/2022 | Yang ................... | H04L 65/1083 |
| 2022/0321974 A1* | 10/2022 | Zang ..................... | G06F 3/0481 |
| 2022/0394344 A1* | 12/2022 | Xie ..................... | H04N 21/4788 |
| 2023/0004593 A1* | 1/2023 | Chen .................. | H04N 21/4788 |
| 2023/0019337 A1* | 1/2023 | D'Auria ................ | G16H 30/20 |
| 2023/0089118 A1* | 3/2023 | Qu ........................ | H04N 21/472 725/59 |
| 2024/0305850 A1* | 9/2024 | Li .......................... | H04L 51/10 |

* cited by examiner

*Primary Examiner* — Alexander Q Huerta
(74) *Attorney, Agent, or Firm* — MCANDREWS HELD & MALLOY, LTD

(57) ABSTRACT

A bullet-screen-comment-based check-in implementation method is provided. The method includes: detecting whether a playback progress of a video reaches a preset first playback progress; in response to detecting that the playback progress of the video reaches the preset first playback progress, displaying, based on a video type of the video, a check-in start card corresponding to the video type, the check-in start card including a check-in button; and displaying a check-in success card on a video playback screen in response to a check-in operation triggered by a user through the check-in button.

16 Claims, 7 Drawing Sheets

In response to detecting a new series check-in video creation request triggered by the user, determining whether there is a created series of check-in videos for which the series-video check-in components have not been fully added — S80

Prohibiting creating the new series of check-in videos in response to determining that there is a created series of check-in videos for which the series-video check-in components have not been fully added — S81

FIG. 8

Displaying a video adding screen based on the video addition request triggered by the user — S90

Detecting an adding operation triggered by the user by selecting a video based on the video adding screen, to obtain the target video — S91

FIG. 9

Displaying a check-in component modification screen based on a modification operation triggered by the user through the target check-in component — S100

Obtaining modified check-in information obtained by the user based on the check-in component modification screen, and updating the target check-in component based on the modified check-in information — S101

FIG. 10

BULLET-SCREEN-COMMENT-BASED CHECK-IN IMPLEMENTATION AND CREATION

CROSS-REFERENCE TO RELATED APPLICATIONS

This application claims priority to Chinese Patent Application No. 202210185723.8, filed on Feb. 28, 2022, the contents of which are hereby incorporated by reference in their entirety for all purposes.

TECHNICAL FIELD

This application relates to the field of video technologies, and in particular, to a bullet-screen-comment-based check-in implementation and creation method and apparatus.

BACKGROUND

When watching videos such as fitness and learning videos in a video application, a user often records a watching behavior of the videos by sending bullet-screen-comments. For example, when the user watches a fitness video named "Do it for X days to own abs" for fitness, the user usually sends a bullet-screen-comment about a quantity of watching times such as "day 3" and "day 10", to record a fitness behavior of the user, to implement a check-in behavior.

SUMMARY

A bullet-screen-comment-based check-in implementation and creation method, a computer device, and a computer-readable storage medium are provided.

According to a first aspect of this application, a bullet-screen-comment-based check-in implementation method is provided, including:
  detecting whether a playback progress of a video reaches a preset first playback progress;
  in response to detecting that the playback progress of the video reaches the preset first playback progress, displaying, based on a video type of the video, a check-in start card corresponding to the video type, where the check-in start card includes a check-in button; and
  displaying a check-in success card on a video playback screen in response to a check-in operation triggered by a user through the check-in button.

According to a second aspect of this application, a bullet-screen-comment-based check-in creation method is provided, including:
  obtaining, based on a check-in component creation request triggered by a user, a target check-in component created by the user based on a video type of a video includes:
  displaying a check-in component selection screen based on the check-in component creation request triggered by the user, where the check-in component selection screen includes a series-video check-in component associated with a series of videos and a single-video repeat check-in component associated with a single video;
  obtaining check-in information set by the user based on a selected check-in component, where the check-in information includes a check-in component name, a start check-in time, and a complete check-in time, the start check-in time is a time at which the target check-in component presents a check-in start card on a video playback screen, and the complete check-in time is a time at which the target check-in component presents a check-in end card on the video playback screen; and
  creating the target check-in component based on the check-in information.

According to a third aspect of this application, a computer device is provided which includes a processor and a memory. The memory stores computer executable instructions that, when executed by the processor, cause the processor to perform the foregoing methods.

According to a fourth aspect of this application, a non-transitory computer-readable storage medium is provided which stores computer instructions. When the computer instructions are executed by a processor, the steps of the foregoing methods are implemented.

BRIEF DESCRIPTION OF DRAWINGS

FIG. 8 is a schematic flowchart of a bullet-screen-comment-based check-in creation method according to some embodiments of this application;

FIG. 9 is a schematic flowchart of detailed steps for obtaining, based on a video addition request triggered by a user, a target video added by the user according to an implementation of this application;

FIG. 10 is a schematic flowchart of a bullet-screen-comment-based check-in creation method according to some embodiments of this application;

DETAILED DESCRIPTION OF EMBODIMENTS

Figure 1:
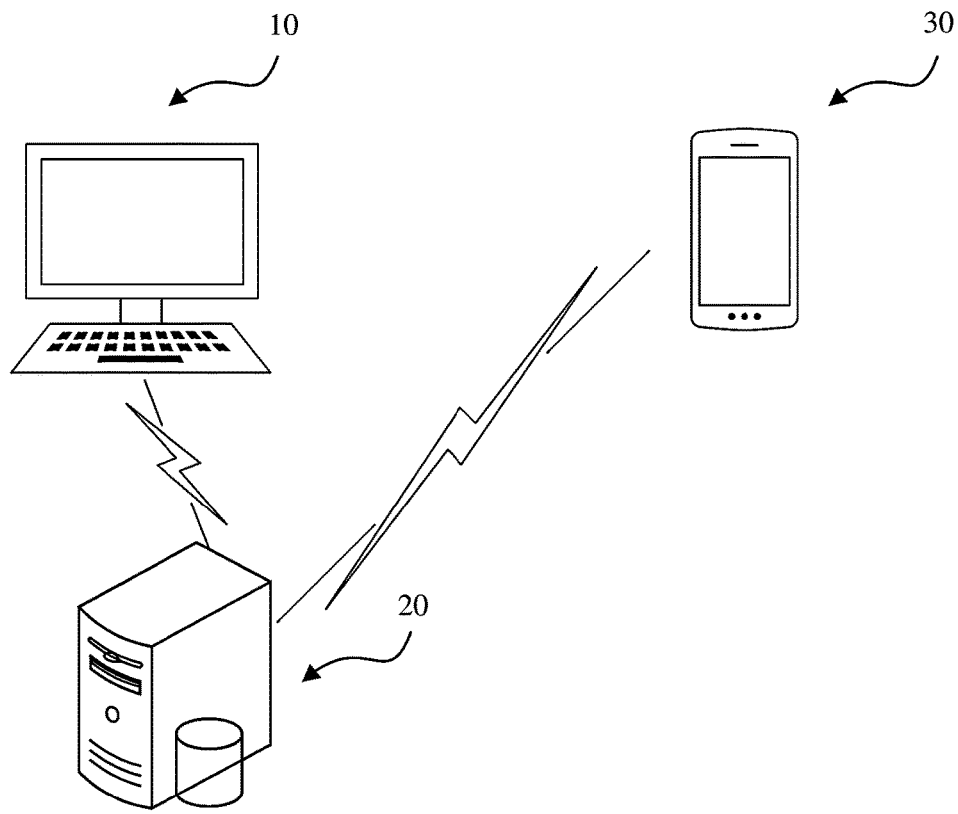
FIG. 1 is a schematic diagram of an application environment of a bullet-screen-comment-based check-in implementation and creation method according to some embodiments of this application.

The following further describes the advantages of this application with reference to the accompanying drawings and exemplary embodiments.

The example embodiments will be described in detail here and the examples are shown in the accompanying drawings. When the following description involves in the accompanying drawings, unless otherwise specified, a same numeral in different accompanying drawings represents a same or similar element. The implementations described in the following example embodiments do not represent all implementations consistent with this disclosure. On the contrary, they are only embodiments of an apparatus and a method detailed in the appended claims and consistent with some aspects of this disclosure.

The terms used in this disclosure are merely used to describe specific embodiments, but are not intended to limit this disclosure. The singular forms "one", "the", and "this" used in this disclosure and the appended claims are also intended to cover plural forms, unless otherwise specified in the context clearly. It should be further understood that the term "and/or" used in this application indicates and includes any or all possible combinations of one or more associated listed items.

It should be understood that, although terms first, second, third, or the like may be used in this disclosure to describe various information, which shall not be limited to these terms. These terms are only used to differentiate between information of a same type. For example, without departing from the scope of this disclosure, first information may also be referred to as second information. Similarly, the second information may also be referred to as the first information. Depending on the context, for example, the word "if" used herein may be explained as "while", "when", or "in response to determining".

In the description of this application, it should be understood that digit numbers before steps does not indicate a sequence of performing the steps, and are only used to facilitate description of this application and differentiation of each step, but are not to be construed as a limitation to this application.

When watching videos such as fitness and learning videos in a video application, a user often records a watching behavior of the videos by sending bullet-screen-comments. For example, when the user watches a fitness video named "Do it for X days to own abs" for fitness, the user usually sends a bullet-screen-comment about a quantity of watching times such as "day 3" and "day 10", to record a fitness behavior of the user, to implement a check-in behavior. However, the inventor finds that these bullet-screen-comments about the quantity of watching times such as "day 3" and "day 10" need to be determined by the user by relying on memory of the user, and content of the bullet-screen-comments needs to be manually input by the user. Consequently, this bullet-screen-comment-based check-in method is very inconvenient.

In view of this, a bullet-screen-comment-based check-in implementation and creation method, a computer device, and a non-transitory computer-readable storage medium are provided to resolve a problem in the related art that a bullet-screen-comment-based check-in method is inconvenient.

FIG. 1 is a schematic diagram of an application environment of a bullet-screen-comment-based check-in implementation and creation method according to some embodiments of this application. In an example embodiment, a system of the application environment may include a first terminal device 10, a server 20, and a second terminal device 30. The first terminal device 10 forms a wireless or wired connection to the server 20. The second terminal device 30 forms a wireless or wired connection to the server 20. The first terminal device 10 and the second terminal device 30 each may be a mobile phone, an iPad, a tablet computer, or the like. The server 20 may be a server cluster or a cloud computing center including one or more servers. This is not limited herein.

Figure 2:
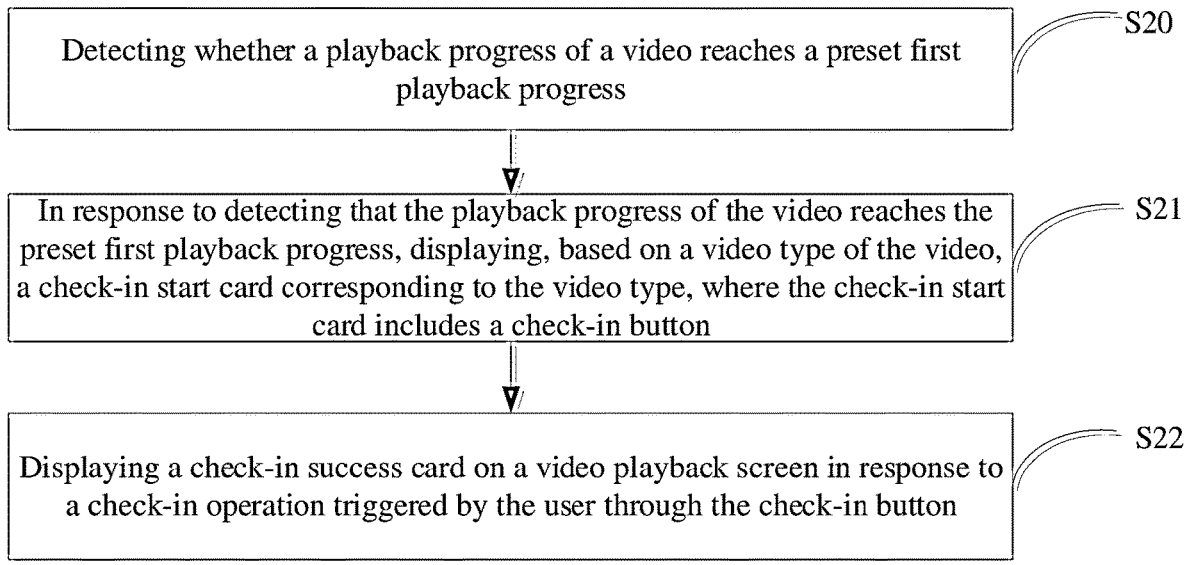
FIG. 2 is a schematic flowchart of a bullet-screen-comment-based check-in implementation method according to some embodiments of this application.

FIG. 2 is a schematic flowchart of a bullet-screen-comment-based check-in implementation method according to some embodiments of this application. It can be understood that the flowchart in this method embodiment is not used to limit a sequence for performing steps. For description, a bullet-screen-comment-based check-in implementation APP installed in the first terminal device is used as an execution body. It can be learned from the figure that the bullet-screen-comment-based check-in implementation method provided in this embodiment includes:

Step S20: detecting whether a playback progress of a video reaches a preset first playback progress.

The first playback progress is a playback time point set in a check-in component. The first playback progress may be flexibly set and modified in the check-in component by an uploader based on an actual situation, or the first playback progress may be set by default by a system. When the video is a series of videos, the first playback progress may also be obtained by obtaining a first playback progress set by a previous video in the series of videos as a first playback progress of a current video. As an example, the first playback progress is 5 minutes and 30 seconds.

The playback progress refers to a current playback time point of the video. For example, if the video is currently played to 2 minutes and 20 seconds, the playback progress of the video is 2 minutes and 20 seconds.

In this embodiment, in a playback process of the video, a playback progress of the current video is detected in real time, to determine, based on a detected playback progress, whether the playback progress of the current video reaches the first playback progress.

It should be noted that, in this embodiment, when the bullet-screen-comment-based check-in implementation APP obtains data of the video from a server, if the video has a check-in component associated with the video, the server further returns the check-in component associated with the video to the bullet-screen-comment-based check-in implementation APP when the data of the video is obtained, so that the bullet-screen-comment-based check-in implementation APP can subsequently implement a check-in function by using the check-in component.

In this embodiment, bullet-screen-comment-based check-in can be performed on not all videos, and bullet-screen-comment-based check-in can be performed only on a video with a check-in component pre-created by a video creator of the video. Therefore, in this embodiment, to prevent resource wasting due to performing the steps of the bullet-screen-comment-based check-in implementation method in this application by the bullet-screen-comment-based check-in implementation APP on a video on which bullet-screen-comment-based check-in cannot be performed. In this embodiment, before the step of detecting whether the playback progress of the video reaches the preset first playback progress, the method further includes:

detecting whether there is a check-in component associated with the video, where the check-in component is configured to display the check-in start card, the check-in end card, and the check-in success card.

The check-in component is a component configured to implement the check-in function in the video. The check-in component is created and saved to the server by the video creator (for example, the uploader) by using a terminal device. An uploader is a network popular word, and refers to a user who uploads video and audio files on a video website, a forum, and an ftp site.

The component is a simple encapsulation of data and a method. The component may have its own attribute and method. The attribute refers to a simple visitor to component data. The method refers to some simple and visible functions of the component. Drag-and-drop programming, fast attribute processing, and true object-oriented design can be implemented by using components.

In this embodiment, before playing the video, the bullet-screen-comment-based check-in implementation APP may first detect whether the video has the check-in component associated with the video. Only when it is detected that the video has the check-in component associated with the video, step S20 is performed. When it is detected that the video has no check-in component associated with the video, it indicates that the video is not a video that supports bullet-screen-comment-based check-in, so that the video is played based on a normal video playback procedure.

Step S21: in response to detecting that the playback progress of the video reaches the preset first playback progress, displaying, based on a video type of the video, a check-in start card corresponding to the video type, where the check-in start card includes a check-in button.

The check-in start card is used to prompt the user to perform a check-in operation. As an example, if the first playback progress is 5 minutes and 30 seconds, when it is detected that the playback progress of the video reaches 5 minutes and 30 seconds, the bullet-screen-comment-based check-in implementation APP displays the check-in start card on a video playback screen by using the check-in component, so that the user can check in by using the check-in button in the check-in start card.

In this embodiment, the video type may include a series-video type and a single-video type. The series-video type refers to that a check-in task includes multiple different videos, and the single-video type refers to that a check-in task includes only one video.

It can be understood that different types of videos display different check-in start cards, that is, the check-in start cards displayed by the different types of videos include different content.

Figure 3A:
FIG. 3a to FIG. 3f are schematic diagrams of cards according to some embodiments of this application.

In an exemplary scenario, referring to FIG. 3a, when the video is a single video, in addition to the check-in start button, the check-in start card may further include a name named by the user for the check-in component, that is, a check-in component name, for example, "September abs challenge". The check-in start card may further include a check-in completion degree of the user, for example, "completion degree 1/30 day".

The check-in start card may further include a check-in progress ranking of the user, for example, "surpassed 22.33 million people".

Figure 3B:

In an exemplary scenario, referring to FIG. 3b, when the video is a series of videos, in addition to the check-in start button, the check-in start card may further include a name named by the user for the check-in component, that is, a check-in component name, for example, "pass JLPT N5 in 30 days". The check-in start card may further include a check-in completion degree of the user, for example, "completion degree 1/30 period". The check-in start card may further include a check-in progress ranking of the user, for example, "surpassed 22.33 million people".

It should be noted that when the user has not participated in the check-in task, a quantity of users who have participated in the check-in task, for example, "88.888 million people have participated", is displayed at a location that is on the check-in start card and that is used to display the check-in progress ranking, and a check-in target, for example, "check-in target 30 periods", "check-in target 30 days", and the like, is displayed at a location that is on the check-in start card and that is used to display the check-in completion degree.

The check-in button is used by the user to perform the check-in operation. In this embodiment, when the user taps the check-in button, the check-in operation is triggered by the user. When the user does not tap the check-in button, the user does not perform the check-in operation.

It should be noted that display duration of the check-in start card may be preset in the check-in component. For example, if the display duration is set to 5 seconds, the check-in component displays the check-in start card for 5 seconds when displaying the check-in start card, and the check-in component does not display the check-in start card after 5 seconds.

Step S22: displaying the check-in success card on a video playback screen in response to a check-in operation triggered by the user through the check-in button.

When the user taps the check-in button to trigger the check-in operation, a check-in instruction is generated. It can be determined, by detecting whether the check-in instruction is generated, whether the user triggers the check-in operation based on the check-in button. When the check-in instruction is detected, it can be determined that the user triggers the check-in operation. When no check-in instruction is detected, it can be determined that the user triggers no check-in operation.

In this embodiment, after the check-in operation triggered by the user is detected, the check-in component displays the check-in success card on the video playback screen.

It can be understood that display duration of the check-in success card may also be preset in the check-in component. For example, if the display duration is set to 5 seconds, the check-in component displays the check-in success card for only 5 seconds when displaying the check-in success card, and the check-in component does not display the check-in success card after 5 seconds.

The check-in success card is used to prompt the user that the check-in operation has been successfully completed. To facilitate the user to understand a check-in progress of the user, and intuitively understand a check-in situation of another user, in this embodiment, the check-in success card can display the check-in component name, the check-in completion degree of the user, and the check-in progress ranking of the user.

The check-in component name is the name that is named by the user to the check-in component, for example, the check-in component name is "September abs challenge". In this embodiment, the check-in component name may also be a default name of the check-in component, and the default name may include a name of the single video and xday, or may include a title for the series of videos and xday, where x is a configured quantity of check-in times increasing by 1.

The check-in completion degree refers to a current cumulative quantity of check-in times of a check-in task in which the user participates. For different types of videos, a definition of check-in completion degree is different. For the single-video type, the check-in completion degree refers to a quantity of days that the user has completed check-in, for example, "completion degree 1/30 day". For the series-video type, the check-in completion degree refers to a quantity of periods that the user has completed check-in videos, for example, "completion degree 1/30 period".

The check-in progress ranking of the user refers to a quantity of other users whose progresses are surpassed by that of the user, for example, the check-in progress ranking of the user is "surpassed 22.23 million people".

In an example implementation, to facilitate interaction with another user participating in check-in, displaying the check-in success card on the video playback screen in response to the check-in operation triggered by the user through the check-in button includes:

displaying the check-in success card and a check-in bullet-screen-comment on the video playback screen in response to the check-in operation triggered by the user through the check-in button.

The check-in bullet-screen-comment may be generated based on the check-in operation, and the check-in bullet-screen-comment is a comment subtitle.

In an implementation, the check-in bullet-screen-comment may be used to reflect a quantity of times that the user participates in the check-in task. For example, if the user performs check-in on a first video or performs first check-in on a video, the check-in bullet-screen-comment may be generated as: "the first day", "the first time", or the like. Similarly, when the user performs check-in on a second video or performs second check-in on the video, the check-in bullet-screen-comment may be generated as: "the second day", "the second time", or the like.

In another implementation, the check-in bullet-screen-comment may also be used to reflect a check-in ranking of the user, for example, the check-in bullet-screen-comment is "the xxxth completes check-in".

In this embodiment, after the user checks in, both the check-in success card and the check-in bullet-screen-comment are simultaneously displayed, so that interaction with the user through the check-in bullet-screen-comment can be implemented while implementing automatic check-in.

In an example implementation, the method further includes:

in response to detecting that the playback progress of the video reaches a preset second playback progress, displaying the check-in end card on the video playback screen.

The second playback progress is also a playback time point set in the check-in component. The second playback progress may be also flexibly set and modified in the check-in component by the uploader based on an actual situation, or the second playback progress may be also set by default by the system. When the video is the series of videos, the second playback progress may also be obtained by obtaining a second playback progress set by the previous video in the series of videos as a second playback progress of the current video. As an example, the second playback progress is 20 minutes and 30 seconds.

As an example, if the second playback progress is 20 minutes and 30 seconds, when it is detected that the playback progress of the video reaches 20 minutes and 30 seconds, the bullet-screen-comment-based check-in implementation APP displays the check-in end card on the video playback screen by using the check-in component, so that the user can understand a check-in status of the user.

It should be noted that display duration of the check-in end card may be preset in the check-in component. For example, if the display duration is set to 5 seconds, the check-in component displays the check-in end card for 5 seconds when displaying the check-in end card, and the check-in component does not display the check-in end card after 5 seconds.

The check-in end card is used to display a check-in end copy, to encourage the user to keep checking in.

In this embodiment, to encourage the user to keep checking in, in this embodiment, the check-in end card can display the check-in end copy, the check-in progress ranking of the user, and a button used to view a check-in record of the user.

The check-in end copy is a text preset in the check-in component. For videos in different video types, different check-in end copies are displayed on check-in end cards. For example, for the single video, a check-in end copy that may be displayed after the user performs the first check-in is "completed this period of check-in". For the series of videos, a check-in end copy that may be displayed after the user performs the first check-in is "completed the first day of check-in" or the like.

In this embodiment, the different check-in end copies are displayed for different types of videos, so that the user can determine a type of the check-in video based on content of the copy.

The check-in progress ranking of the user refers to a quantity of other users whose progresses are surpassed by that of the user, for example, the check-in progress ranking of the user is "surpassed 22.23 million people".

The button used to view the check-in record of the user can facilitate the user to trigger an operation of obtaining the check-in record. After the user taps the button, the bullet-screen-comment-based check-in implementation APP obtains a historical check-in record of the user from the server, and then displays the obtained historical check-in record in a card form, so that the user can query a historical check-in status of the user.

Figure 3C:
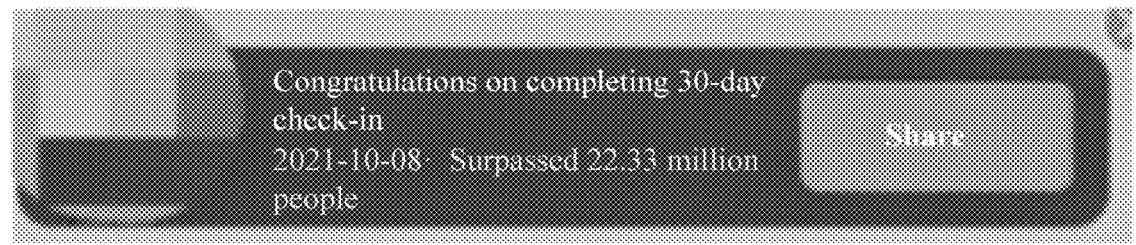
Figure 3D:
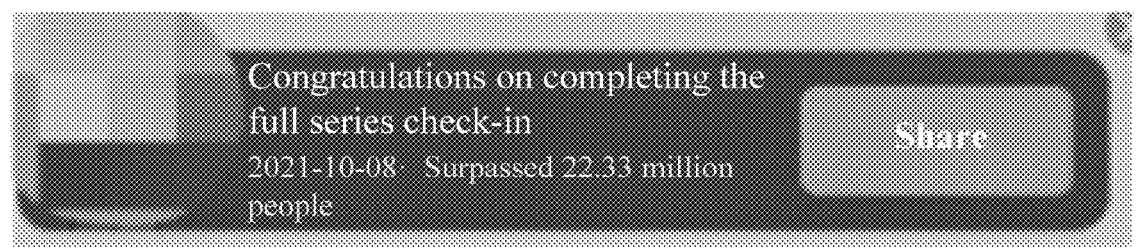

In an implementation, a share button may be further set on the check-in end card displayed each time the user checks in, to share, by using the share button, the check-in record of the user with another user for viewing. In another implementation, referring to FIG. 3c and FIG. 3d, a share button may alternatively be set on a check-in end card displayed after the user completes all check-in tasks (tasks of the series of videos or repeated tasks of the single video), to share, by using the share button, the check-in record of the user with another user for viewing.

In an implementation, the check-in end card may further display a check-in time of this time, for example, a displayed check-in time is "2021-09-08".

It should be noted that each time after the user taps the check-in button on the check-in start card, the bullet-screen-comment-based check-in implementation APP generates check-in data based on this check-in operation, and then uploads the check-in data to the server, so that the server can associate the check-in data with a user account and save the check-in data to update the check-in record. The check-in data may include the check-in time, check-in video information, and the like. In an implementation, when the user performs multiple times of check-in within a check-in period (for example, 1 day) on a same video, after check-in data is uploaded to the server, the server may associate only check-in data generated by the first time check-in with the user account and save the check-in data, and delete check-in data generated by other repeated check-in. In another implementation, when the user performs multiple times of check-in within one day on a same video, after check-in data is uploaded to the server, the server may use check-in data generated by next check-in to update previously stored check-in data, and then associate updated check-in data with the user account and save the updated check-in data.

Figure 3E:
Figure 3F:

In an example implementation, after the user completes the check-in task, the user may re-participate in the check-in task. When the user re-participates in the check-in task, corresponding re-check-in cards may be displayed based on different types of videos when the video is played to the first playback progress. In an exemplary scenario, when the video is in the single-video type, a re-check-in card shown in FIG. 3e may be displayed. When the video is in the series-video type, a re-check-in card shown in FIG. 3f may be displayed.

In an example implementation, to facilitate display of the card, the check-in component may include a start check-in component and an end check-in component. The start check-in component is configured to display the check-in start card and the check-in success card on the video playback screen. The end check-in component is configured to display the check-in end card on the video playback screen, to attract the user to complete watching of the check-in video, and is configured to distinguish a user who does not tap the check-in button on the check-in start card from a user who taps the check-in button on the check-in start card. When the user does not tap the check-in button on the check-in start card, the check-in end card is not displayed in a video playback process.

In this embodiment, the check-in component is divided into the start check-in component and the end check-in component, so that each component can display a corresponding card.

The bullet-screen-comment-based check-in implementation method in this embodiment includes: detecting whether a playback progress of a video reaches a preset first playback progress; if the playback progress of the video reaches the first playback progress set in the check-in component, displaying a check-in start card on a video playback screen, where the check-in start card includes a check-in button; displaying a check-in success card on the video playback screen by detecting a check-in operation triggered by a user based on the check-in button; and if the playback progress of the video reaches a preset second playback progress, displaying a check-in end card on the video playback screen. According to the bullet-screen-comment-based check-in implementation method in this embodiment, a check-in behavior of the user can be displayed in a card manner, and the user does not need to manually input a bullet-screen-comment to record the check-in behavior of the user, so that it is very convenient and easy to implement the check-in behavior. In addition, because the check-in component is associated with the video, different check-in copies can be displayed for different videos in this application. In addition, in this application, a corresponding card can be displayed based on a different video type, which can improve diversity of card display, and different content included in cards displayed on the different types of videos enables the user to conveniently distinguish a type to which a currently check-in video belongs. In addition, in comparison with a manner in which only the check-in start card is displayed in the related art, in this application, the check-in start card and the check-in end card can be displayed when the user watches the video, which can attract the user to finish watching the check-in video.

Figure 4:
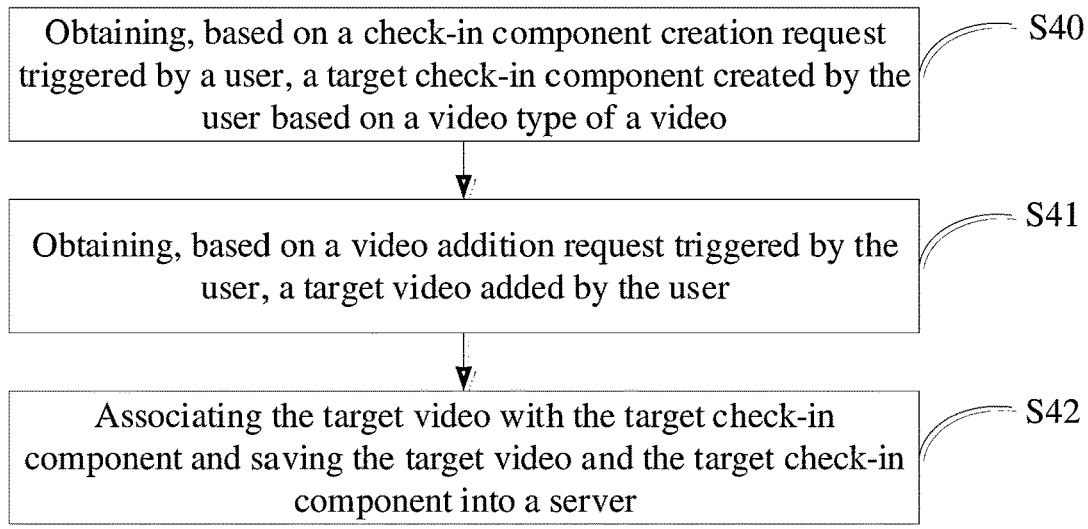
FIG. 4 is a schematic flowchart of a bullet-screen-comment-based check-in creation method according to some embodiments of this application.

FIG. 4 is a schematic flowchart of a bullet-screen-comment-based check-in creation method according to some embodiments of this application. It can be understood that the flowchart in this method embodiment is not used to limit a sequence for performing steps. For description, a bullet-screen-comment-based check-in creation APP installed in a second terminal device is used as an execution body. It can be learned from the figure that the bullet-screen-comment-based check-in implementation method provided in this embodiment includes:

Step S40: obtaining, based on a check-in component creation request triggered by a user, a target check-in component created by the user based on a video type of a video.

The check-in component creation request may be obtained based on a check-in component creation operation performed by the user. That is, when the check-in component creation operation performed by the user is detected, it can be determined that the check-in component creation request triggered by the user is obtained.

In this embodiment, when the target check-in component is created, different target check-in components are created for videos of different video types.

When the user creates the target check-in component by using the bullet-screen-comment-based check-in creation APP, the user needs to log in to the bullet-screen-comment-based check-in creation APP, for example, log in to the bullet-screen-comment-based check-in creation APP by using a user account or a mobile number.

Figure 5:
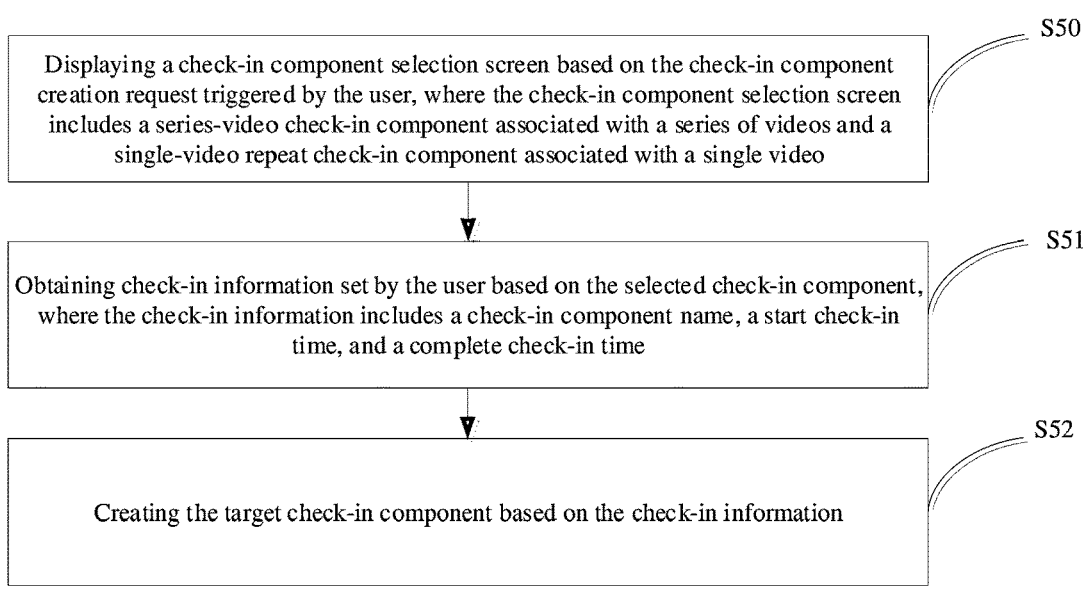
FIG. 5 is a schematic flowchart of detailed steps for obtaining, based on a check-in component creation request triggered by a user, a target check-in component created by the user based on a video type of a video according to an implementation of this application.

In an example implementation, to improve efficiency of creating the target check-in component, multiple predefined check-in components may be provided to the user, so that the user can select an appropriate check-in component. Referring to FIG. 5, the obtaining, based on a check-in component creation request triggered by a user, a target check-in component created by the user based on a video type of a video may include:

Step S50: displaying a check-in component selection screen based on the check-in component creation request triggered by the user, where the check-in component selection screen includes a series-video check-in component associated with a series of videos and a single-video repeat check-in component associated with a single video.

Figure 7A:
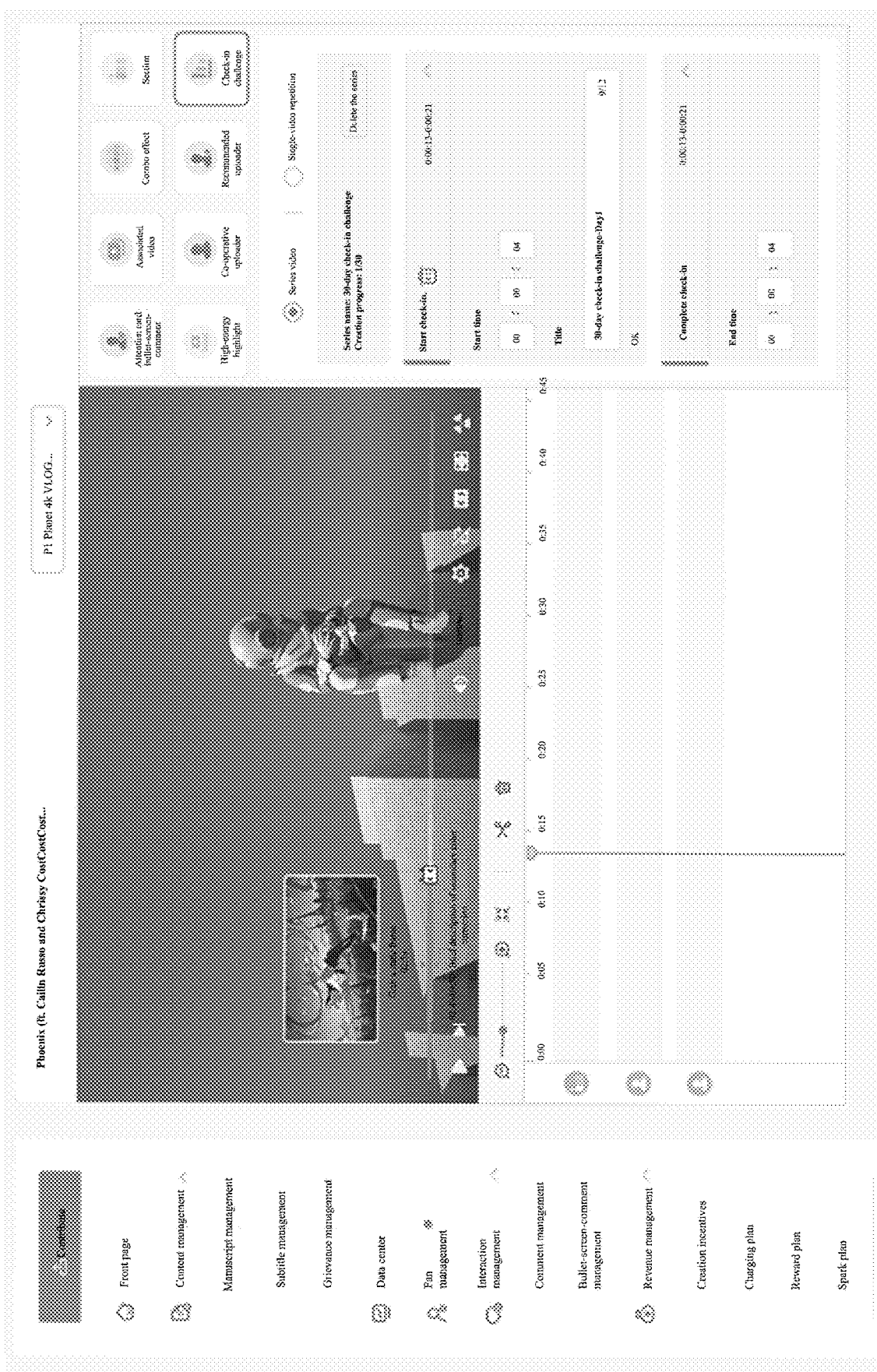
FIG. 7a and FIG. 7b respectively are example diagrams of a check-in component selection screen and a series-video creation screen according to an implementation of this application.

For ease of understanding, FIG. 7a is an example diagram of a check-in component selection screen. The check-in component selection screen includes two check-in components: the series-video repeat check-in component and the single-video repeat check-in component. The user may select the series-video repeat check-in component by default on the check-in component selection screen. It should be noted that the user may alternatively select the single-video repeat check-in component by default on the check-in component selection screen.

It can be understood that, after the single-video repeat check-in component is selected by the user, the single-video repeat check-in component is the target check-in component selected by the user. When the user performs no selection operation on the check-in component selection screen, the series-video repeat check-in component is the target check-in component selected by the user.

The series-video check-in component is a check-in component that is used to associate a series of target videos. The single-video repeat check-in component is a check-in component that is used to associate only one single video, that is, repeat check-in may be performed on one video, a check-in status may be refreshed every day, and check-in may be performed once a day.

Step S51: obtaining check-in information set by the user based on the selected check-in component, where the check-in information includes a check-in component name, a start check-in time, and a complete check-in time.

The check-in component selected by the user is only a template check-in component. In the template check-in component, the user may set the check-in information. The user may set the check-in component name, the start check-in time, and the complete check-in time of the selected check-in component.

The check-in component name may be usually named based on a video on which check-in needs to be performed. For example, the check-in component name is "September abs challenge".

The start check-in time is a time at which the target check-in component displays a check-in start card on a video playback screen. The complete check-in time is a time at which the target check-in component displays a check-in end card on the video playback screen.

In this embodiment, in addition to setting the foregoing information of the target check-in component, display duration and display styles of various cards, and the like may be further set.

In an implementation, when the check-in component selected by the user is the single-video repeat check-in component, the check-in information further includes quantity information of check-in times, and the quantity information of check-in times is a total quantity of times that the user needs to check in.

In an implementation, the quantity information of check-in times may be set and modified by an uploader.

In an example implementation, when the selected check-in component is a single-video repeat check-in component, the check-in information further includes at least one of a check-in period or a quantity of check-in times.

The check-in period is a time interval at which the user performs check-in on the video. For example, the check-in period is 2 days, it indicates that the user needs to perform check-in on the video every 2 days, that is, the user needs to perform check-in on the video every other day not every day.

It can be understood that when the user does not set the check-in period, check-in needs to be performed on the video every day by default.

In this embodiment, the check-in period is added to the check-in information, thereby implementing flexible setting of the check-in period.

The quantity of check-in times is a total quantity of times that the user needs to perform check-in on the video.

Figure 6:
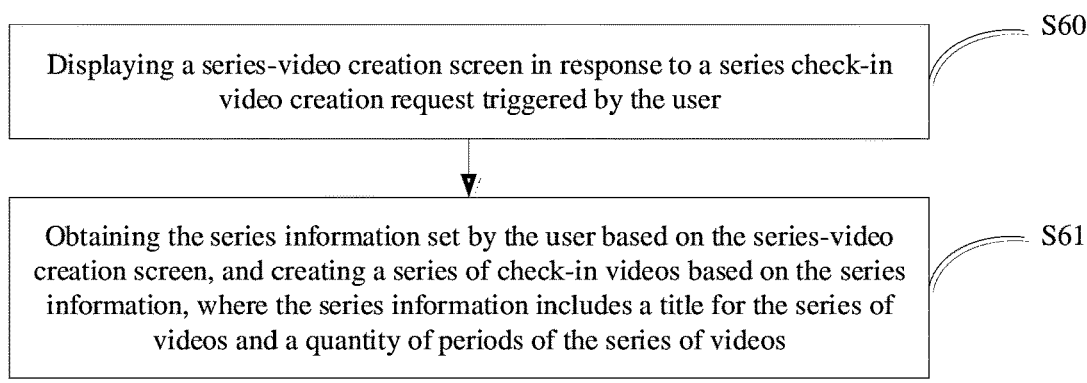
FIG. 6 is a schematic flowchart of a bullet-screen-comment-based check-in creation method according to some embodiments of this application.

In an example implementation, referring to FIG. 6, when the check-in component selected by the user is the series-video check-in component, the method further includes:

Step S60: displaying a series-video creation screen in response to a series check-in video creation request triggered by the user.

When the user wants to create the single-video repeat check-in component, the user needs to first create a series of check-in videos by first triggering the series check-in video creation request. Only after the series of check-in videos are created, the series-video check-in component can be created.

Figure 7B:
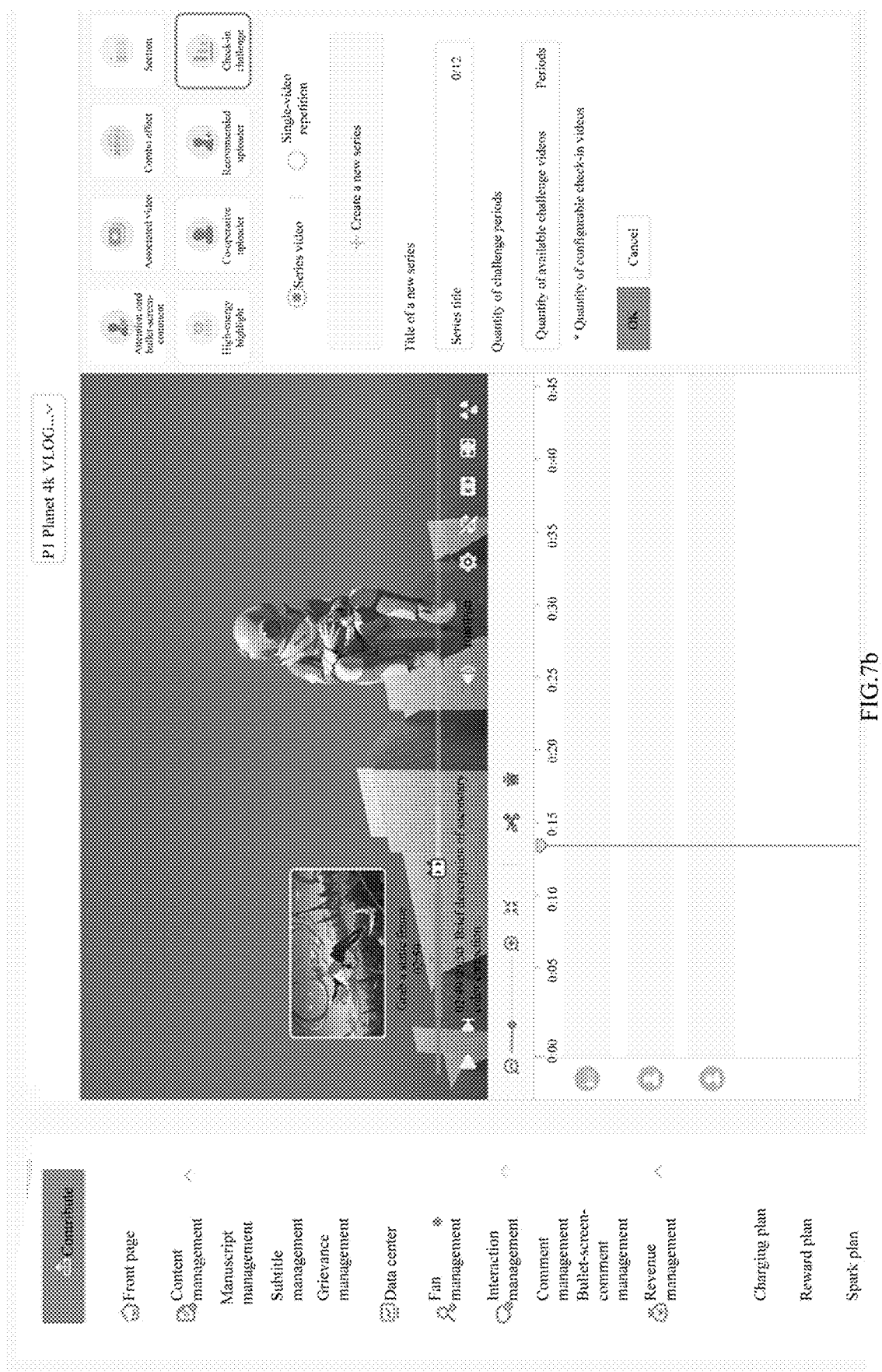

In an exemplary scenario, the displayed series-video creation screen is shown in FIG. 7*b*. The user may set series information of the series of videos by using the series-video creation screen.

Step S61: obtaining the series information set by the user based on the series-video creation screen, and creating a series of check-in videos based on the series information, where the series information includes a title for the series of videos and a quantity of periods of the series of videos.

The title for the series of videos may be set by the user based on an actual situation, for example, the title for the series of videos is "30-day check-in challenge". The quantity of periods of the series of videos is a quantity of a series of videos on which check-in need to be performed. The quantity of periods of the series of videos may also be set by the user based on an actual situation.

In this embodiment, after the series of check-in videos are created, the series information of the series of check-in videos can no longer be modified.

In an example implementation, with reference to FIG. 8, the method further includes:

Step S80: in response to detecting that a new series check-in video creation request triggered by the user, determining whether there is a created series of check-in videos for which the series-video check-in components have not been fully added. Step S81: prohibiting creating the new series of check-in videos in response to determining that there is a created series of check-in videos for which the series-video check-in components have not been fully added.

When the user needs to create target check-in components for the new series of check-in videos, the user may trigger the new series check-in video creation request.

However, multiple target check-in components need to be created for the series of check-in videos during creation of the target check-in components. Therefore, to avoid confusion between target check-in components of another series of check-in videos and the check-in components of the new series of videos, in this embodiment, when the new series check-in video creation request triggered by the user is detected, it may be first determined whether there is the created series of check-in videos for which the series-video check-in components have not been fully added. If not, the created series of check-in videos need to first add the series-video check-in components, and creation of the new series of check-in videos is prohibited.

In this embodiment, after a corresponding target check-in component is created for each of the series of videos, each created target check-in component may be deleted, or the target components of the entire series of videos may be deleted. When the series of videos are deleted, all the target check-in components of the series of videos are deleted.

In this embodiment, the created target check-in component appears in pairs, that is, the target check-in component includes a start check-in component and an end check-in component.

In an example implementation, when the target check-in component includes the start check-in component and the end check-in component, the method further includes: deleting the start check-in component and the end check-in component in response to a deletion operation triggered by the user based on the start check-in component.

In this embodiment, the check-in start component includes a delete button, and the user may trigger the deletion operation by tapping the delete button. After the deletion operation triggered by the user based on the start check-in component is detected, the start check-in component and the end check-in component are deleted together.

It can be understood that when the start check-in component is deleted, the end check-in component is also deleted. Therefore, in this embodiment, the end check-in component may be provided with no delete button, that is, the start check-in component includes the delete button, and the end check-in component includes no delete button.

In an example implementation, the method further includes:

deleting, in response to the deletion operation triggered by the user based on the series of check-in videos, all the target check-in components associated with the series of check-in videos.

In this embodiment, after the series of check-in videos are created, the user may delete the created series of check-in videos. After the user deletes the series of check-in videos, all target check-in components associated with this series of check-in videos are synchronously deleted, thereby reducing storage space.

In an example implementation, when there are multiple series of check-in videos without fully adding target check-in components (this happens when the user deletes target check-in components with a full series of check-in videos), if the user needs to add target check-in components to a series of check-in videos at this time, before adding the target check-in components, the user needs to first select to add target check-in components to which series of check-in videos.

Step S52: creating the target check-in component based on the check-in information.

After the check-in information is set based on the selected check-in component, check-in information in the template check-in component may be updated based on the check-in information to generate the target check-in component.

Step S41: obtaining, based on a video addition request triggered by the user, a target video added by the user.

After the user completes creation of the target check-in component, a target video needs to be selected for binding with the target check-in component. To select a to-be-bound target video, the user may trigger the video addition request. In this embodiment, the video addition request triggered by the user may be obtained based on a video adding operation performed by the user. That is, when the video adding operation performed by the user is detected, it can be determined that the video addition request triggered by the user is obtained.

In an example implementation, to improve efficiency of adding the target video, referring to FIG. 9, the obtaining, based on a video addition request triggered by the user, a target video added by the user includes: Step S90: displaying a video adding screen based on the video addition request triggered by the user. Step S91: detecting an adding operation triggered by the user by selecting a video based on the video adding screen, to obtain the target video.

After the user triggers the video addition request, the video adding screen is displayed. By using the video adding screen, the user may select a video from at least one to-be-selected video as the target video, and the user may perform the adding operation after selecting the video. In this way, after the adding operation performed by the user is detected, the video is added, so that the target video can be obtained.

It should be noted that when a video to-be-bound to the series-video check-in component is added to the series-video check-in component, a same video can be bound to only one target check-in component, but cannot be bound to multiple target check-in components. In addition, a same video can be used as only one video in one series of check-in videos, so as to be bound to the target check-in component, but cannot be used as one video in multiple series of check-in videos.

Step S42: associating the target video with the target check-in component and saving the target video and the target check-in component into a server.

After the user selects the target video, the target video may be associated with and bound to the target check-in component, so that when the video is played, a check-in function can be implemented by using the target check-in component.

In this embodiment, one corresponding check-in component is added to each video, so that a video check-in bullet-screen-comment can be flexibly set.

In an example implementation, with reference to FIG. 10, the method further includes: Step S100: displaying a check-in component modification screen based on a modification operation triggered by the user through the target check-in component. Step S101: obtaining modified check-in information obtained by the user based on the check-in component modification screen, and updating the target check-in component based on the modified check-in information.

After the user creates the target check-in component, the user may modify the check-in information of the target check-in component by triggering the modification operation. After the user completes modifying the check-in information, the user updates the target check-in component by using the modified check-in information.

In this embodiment, information such as the check-in component name, the quantity information of check-in times, the start check-in time, and the complete check-in time can be modified.

Figure 11:
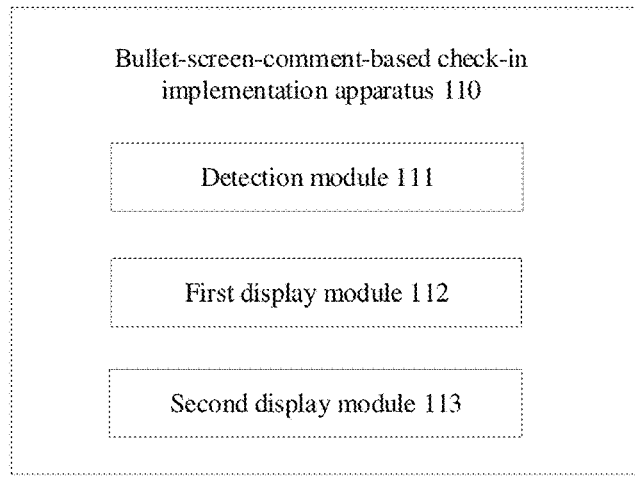
FIG. 11 is a diagram of program modules of a bullet-screen-comment-based check-in implementation apparatus according to some embodiments of this application.

FIG. 11 is a diagram of program modules of a bullet-screen-comment-based check-in implementation apparatus 110 according to some embodiments of this application.

In this embodiment, the bullet-screen-comment-based check-in implementation apparatus 110 includes a series of computer program instructions stored in a memory. When the computer program instructions are executed by a processor, the bullet-screen-comment-based check-in function according to each embodiment of this application can be implemented. In some embodiments, based on an operation implemented by each part of the computer program instructions, the bullet-screen-comment-based check-in implementation apparatus 110 may be divided into one or more modules, which may be divided into the following modules:

a detection module 111, configured to detect whether a playback progress of a video reaches a preset first playback progress;

a first display module 112, configured to: display, in response to detecting that the playback progress of the video reaches the preset first playback progress and based on a video type of the video, a check-in start card corresponding to the video type, where the check-in start card includes a check-in button; and a second display module 113, configured to display a check-in success card on a video playback screen in response to a check-in operation triggered by a user through the check-in button.

In an example implementation, the bullet-screen-comment-based check-in implementation apparatus 110 further includes a third display module.

The third display module is configured to: display, in response to detecting that the playback progress of the video reaches a preset second playback progress, a check-in end card on the video playback screen.

In an example implementation, the detection module is further configured to detect whether there is a check-in component associated with the video, where the check-in component is configured to display the check-in start card, the check-in end card, and the check-in success card.

In an example implementation, the second display module 113 is further configured to display the check-in success card and a check-in bullet-screen-comment on the video playback screen in response to the check-in operation triggered by the user through the check-in button.

In an example implementation, the check-in component includes a start check-in component configured to display the check-in start card and the check-in success card on the video playback screen, and an end check-in component configured to display the check-in end card on the video playback screen.

In an example implementation, a check-in component name, a check-in completion degree of the user, and a check-in progress ranking of the user are displayed on the check-in success card, and a check-in end copy, the check-in progress ranking of the user, and a button to view a check-in record of the user are displayed on the check-in end card.

A bullet-screen-comment-based check-in implementation method in this embodiment includes: detecting whether a playback progress of a video reaches a preset first playback progress; if the playback progress of the video reaches the first playback progress set in the check-in component, displaying a check-in start card on a video playback screen, where the check-in start card includes a check-in button; displaying a check-in success card on the video playback screen by detecting a check-in operation triggered by a user based on the check-in button; and if the playback progress of the video reaches a preset second playback progress, displaying a check-in end card on the video playback screen. According to the bullet-screen-comment-based check-in implementation method in this embodiment, a check-in behavior of the user can be displayed in a card manner, and the user does not need to manually input a bullet-screen-comment to record the check-in behavior of the user, so that it is very convenient and easy to implement the check-in behavior. In addition, because the check-in component is associated with the video, different check-in copies can be displayed for different videos in this application. In addition, in this application, a corresponding card can be displayed based on a different video type, which can improve diversity of card display, and different content included in cards displayed on different types of videos enables the user to conveniently distinguish a type to which a currently check-in video belongs. In addition, in comparison with a manner in which only the check-in start card is displayed in the related art, in this application, the check-in start card and the check-in end card can be displayed when the user watches the video, which can attract the user to finish watching the check-in video.

Figure 12:
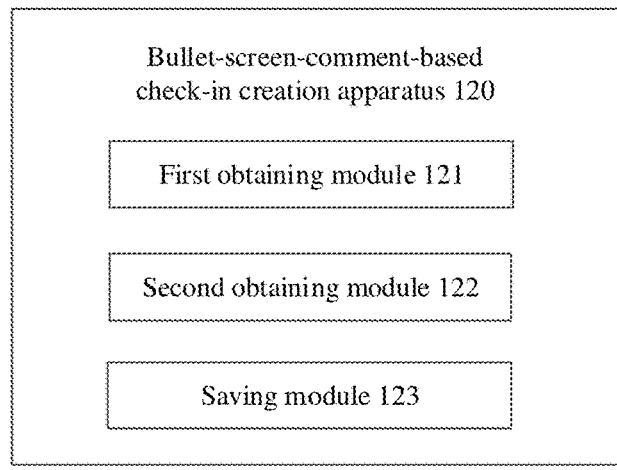
FIG. 12 is a diagram of program modules of a bullet-screen-comment-based check-in creation apparatus according to this application.

FIG. 12 is a diagram of program modules of a bullet-screen-comment-based check-in creation apparatus 120 according to some embodiments of this application.

In this embodiment, the bullet-screen-comment-based check-in creation apparatus 120 includes a series of computer program instructions stored in a memory. When the computer program instructions are executed by a processor, the bullet-screen-comment-based check-in creation function according to each embodiment of this application can be implemented. In some embodiments, based on an operation implemented by each part of the computer program instructions, the bullet-screen-comment-based check-in creation apparatus 120 may be divided into one or more modules, which may be divided into the following modules:

a first obtaining module 121, configured to obtain, based on a check-in component creation request triggered by a user, a target check-in component created by the user based on a video type of a video;

a second obtaining module 122, configured to obtain, based on a video addition request triggered by the user, a target video added by the user; and a saving module 123, configured to associate the target video with the target check-in component and save the target video and the target check-in component into a server.

In an example implementation, the first obtaining module 121 is further configured to: display a check-in component selection screen based on the check-in component creation request triggered by the user, where the check-in component selection screen includes a series-video check-in component associated with a series of videos and a single-video repeat check-in component associated with a single video; obtain check-in information set by the user based on the selected target check-in component, where the check-in information includes a check-in component name, quantity information of check-in times, a start check-in time, and a complete check-in time, where the start check-in time is a time at which the target check-in component displays a check-in start card on a video playback screen, and where the complete check-in time is a time at which the target check-in component displays a check-in end card on the video playback screen; and create the target check-in component based on the check-in information.

In an example implementation, when the user selects the series-video check-in component as the target check-in component, the bullet-screen-comment-based check-in creation apparatus 120 further includes a response module and a creation module.

The response module is configured to display a series-video creation screen in response to a series check-in video creation request triggered by the user.

The creation module is configured to obtain series information set by the user based on the series-video creation screen, and create a series of check-in videos based on the series information, where the series information includes a title for the series of videos and a quantity of periods of the series of videos.

In an example implementation, the bullet-screen-comment-based check-in creation apparatus 120 further includes a determining module and a forbidding module.

The determining module is configured to: determine, in response to detecting a new series check-in video creation request triggered by the user, whether there is a created series of check-in videos for which the series-video check-in components have not been fully added.

The forbidding module is configured to forbid creating the new series of check-in videos in response to determining that there is a created series of check-in videos for which the series-video check-in components have not been fully added.

In an example implementation, the second obtaining module 122 is further configured to: display a video adding screen based on the video addition request triggered by the user; and detect an adding operation triggered by selecting a video by the user through the video adding screen, to obtain the target video.

In an example implementation, the bullet-screen-comment-based check-in creation apparatus 120 further includes a display module and an update module.

The display module is configured to display a check-in component modification screen based on a modification operation triggered by the user through the target check-in component.

The updating module is configured to obtain modified check-in information obtained by the user through the check-in component modification screen, and update the target check-in component based on the modified check-in information.

In an example implementation, the bullet-screen-comment-based check-in creation apparatus 120 further includes a deletion module.

The deletion module is configured to delete the start check-in component and the end check-in component in response to a deletion operation triggered by the user through the start check-in component.

In an example implementation, the deletion module is further configured to delete, in response to a deletion operation for the series of check-in videos triggered by the user, all target check-in components associated with the series of check-in videos.

In an example implementation, when the selected check-in component is the single-video repeat check-in component, the check-in information further includes at least one of a check-in period or a quantity of check-in times.

Figure 13:
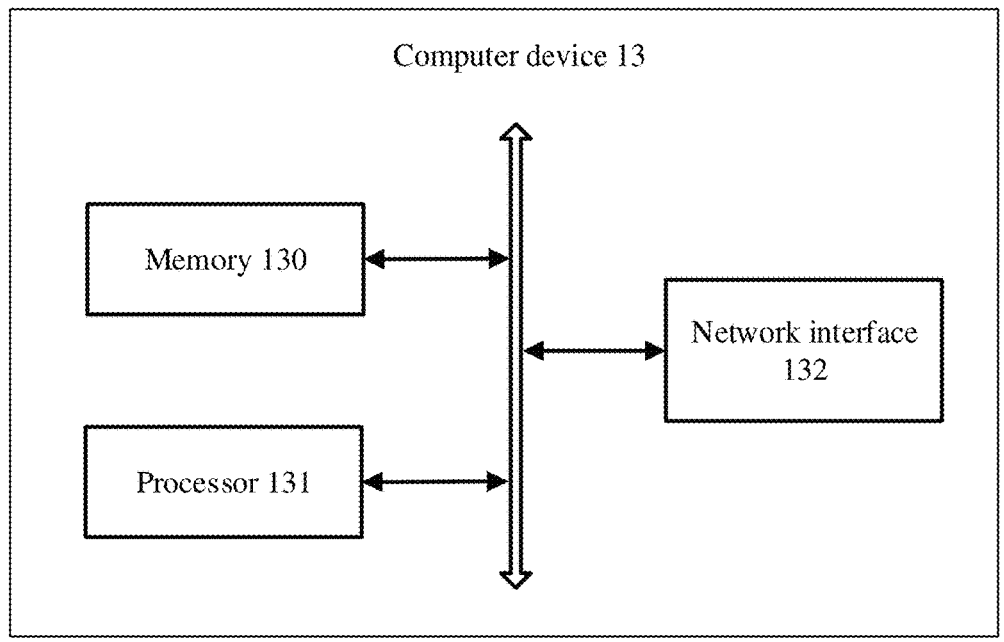
FIG. 13 is a schematic diagram of a hardware structure of a computer device performing a bullet-screen-comment-based check-in implementation and creation method according to some embodiments of this application.

FIG. 13 is a schematic diagram of a hardware architecture of a computer device 13 suitable for implementing a bullet-screen-comment-based check-in implementation and creation method according to some embodiments of this application. In this embodiment, the computer device 13 is a device that can automatically calculate a value and/or process information based on instructions that are set or stored in advance. For example, the computer device 13 may be a tablet computer, a notebook computer, a desktop computer, a rack server, a blade server, a tower server, a cabinet server (including an independent server, or a server cluster including multiple servers), or the like. As shown in FIG. 13, the computer device 13 at least includes but is not limited to: a memory 130, a processor 131, and a network interface 132 that can be communicatively connected to each other by using a system bus.

The memory 130 includes at least one type of computer-readable storage medium. The readable storage medium may be volatile or non-volatile. The readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the memory 130 may be an internal storage module of the computer device 13, such as a hard disk or a memory of the computer device 13. In some other embodiments, the memory 130 may be an external storage device of the computer device 13, for example, a removable hard disk, a smart media card (SMC), a secure digital (SD) card, or a flash card that is disposed on the computer device 13. Certainly, the memory 130 may include both an internal storage module of the computer device 13 and an external storage device of the computer device 13. In this embodiment, the memory 130 is usually configured to store an operating system and various application software that are installed on the computer device 13, for example, program code of the bullet-screen-comment-based check-in implementation and creation method. In addition, the memory 130 may be further configured to temporarily store various types of data that has been output or is to be output.

In some embodiments, the processor 131 may be a central processing unit (CPU), a controller, a microcontroller, a microprocessor, or another bullet-screen-comment-based check-in implementation and creation chip. The processor 131 is usually configured to control an overall operation of the computer device 13, for example, perform control and processing related to data exchange or communication performed by the computer device 13. In this embodiment, the processor 131 is configured to run program code stored in the memory 130 or process data.

The network interface 132 may include a wireless network interface or a wired network interface, and the network interface 132 is usually configured to establish a communication link between the computer device 13 and another computer device. For example, the network interface 132 is configured to: connect the computer device 13 to an external terminal by using a network, and establish a data transmission channel, a communication link, and the like between the computer device 13 and the external terminal. The network may be a wireless or wired network such as an Intranet, the Internet, a global system for mobile communications (GSM), a wideband code division multiple access (WCDMA), a 4G network, a 5G network, Bluetooth, or Wi-Fi.

It should be noted that FIG. 13 shows only a computer device with the components 120 to 122. However, it should be understood that implementation of all the shown components is not required, and more or fewer components may alternatively be implemented.

In this embodiment, the bullet-screen-comment-based check-in implementation and creation method stored in the memory 130 may be further divided into one or more program modules to be executed by one or more processors (the processor 131 in this embodiment), to complete this embodiment of this application.

Some embodiments of this application provide a computer-readable storage medium. The computer-readable storage medium stores a computer program. When the computer program is executed by a processor, the steps of the bullet-screen-comment-based check-in implementation and creation method in the embodiments are implemented.

In this embodiment, the computer-readable storage medium includes a flash memory, a hard disk, a multimedia card, a card-type memory (for example, an SD memory or a DX memory), a random access memory (RAM), a static random access memory (SRAM), a read-only memory (ROM), an electrically erasable programmable read-only memory (EEPROM), a programmable read-only memory (PROM), a magnetic memory, a magnetic disk, an optical disc, and the like. In some embodiments, the computer-readable storage medium may be an internal storage unit of a computer device, such as a hard disk or a memory of the computer device. In some other embodiments, the computer-readable storage medium may be an external storage device of the computer device, for example, a removable hard disk, a smart media card (SMC), a secure digital (SD) card, or a flash card that is disposed on the computer device. Certainly, the computer-readable storage medium may include both an internal storage unit of the computer device and an external storage device of the computer device. In this embodiment, the computer-readable storage medium is usually configured to store an operating system and various application software that are installed on the computer device, for example, program code of the bullet-screen-comment-based check-in implementation and creation method in the embodiments. In addition, the computer-readable storage medium may be further configured to temporarily store various types of data that has been output or is to be output.

The apparatus embodiments described above are only schematic, and units described as separate components may or may not be physically separated. Components displayed as units may or may not be physical units, that is, the components may be located in one place, or may be distributed to at least two network units. Some or all of the modules may be selected based on actual needs to achieve the objective of the solution of the embodiments of this application. Those of ordinary skill in the art can understand and implement the embodiment without creative efforts.

Through the description of the foregoing implementations, those of ordinary skill in the art can clearly understand that the implementations can be implemented by using software plus a universal hardware platform, or certainly, can be implemented through hardware. Those of ordinary skill in the art can understand that all or some of processes for implementing the methods of the foregoing embodiments can be completed by instructing relevant hardware through a computer program. The program may be stored in a computer-readable storage medium. When the program is executed, processes of the embodiments of the foregoing methods may be included. The storage medium may be a magnetic disk, an optical disc, a read-only memory (ROM), a random access memory (RAM), or the like.

Finally, it should be noted that the foregoing embodiments are merely intended for describing the technical solutions of this application, but not for limiting this application. Although this application is described in detail with reference to the foregoing embodiments, those of ordinary skill in the art should understand that they may still make modifications to the technical solutions described in the foregoing embodiments or make equivalent replacements to some or all technical features thereof. These modifications or replacements do not make the essence of the corresponding technical solutions deviate from the scope of the technical solutions of the embodiments of this application.

What is claimed is:

1. A method, comprising:
    detecting whether a playback progress of a video reaches a preset first playback progress;
    in response to detecting that the playback progress of the video reaches the preset first playback progress, displaying, based on a video type of the video, a check-in start card corresponding to the video type, wherein the check-in start card comprises a check-in button;
    in response to detecting that the playback progress of the video reaches a preset second playback progress, displaying a check-in end card on the video playback screen; and
    displaying a check-in success card on a video playback screen in response to a check-in operation triggered by a user through the check-in button,
    wherein a check-in component name, a check-in completion degree of the user, and a check-in progress ranking of the user are displayed on the check-in success card, and a check-in end copy, the check-in progress ranking of the user, and a button to view a check-in record of the user are displayed on the check-in end card.

2. The method according to claim 1, wherein the method further comprises:
    before detecting whether the playback progress of the video reaches the preset first playback progress, detecting whether there is a check-in component associated with the video, wherein the check-in component is configured to display the check-in start card, the check-in end card, and the check-in success card.

3. The method according to claim 2, wherein the check-in component comprises a start check-in component configured to display the check-in start card and the check-in success card on the video playback screen, and an end check-in component configured to display the check-in end card on the video playback screen.

4. The method according to claim 1, wherein displaying the check-in success card on the video playback screen in response to the check-in operation triggered by the user through the check-in button comprises:
    displaying the check-in success card and a check-in bullet-screen-comment on the video playback screen in response to the check-in operation triggered by the user through the check-in button.

5. A non-transitory computer-readable storage medium storing computer instructions that, when executed by a processor, cause the processor to perform the method according to claim 1.

6. A method, comprising:
    obtaining, based on a check-in component creation request triggered by a user, a target check-in component created by the user based on a video type of a video;
    obtaining, based on a video addition request triggered by the user, a target video added by the user, comprising;
        displaying a video adding screen based on the video addition request triggered by the user and
    detecting an adding operation triggered by selecting a video by the user through the video adding screen, to obtain the target video;
    associating the target video with the target check-in component; and
    saving the target video and the target check-in component into a server.

7. The method according to claim 6, wherein obtaining, based on the check-in component creation request triggered by the user, the target check-in component created by the user based on the video type of the video comprises:
    displaying a check-in component selection screen based on the check-in component creation request triggered by the user, wherein the check-in component selection screen comprises a series-video check-in component associated with a series of videos and a single-video repeat check-in component associated with a single video;
    obtaining check-in information set by the user based on the selected target check-in component, wherein the check-in information comprises a check-in component name, a start check-in time, and a complete check-in time, wherein the start check-in time is a time when the target check-in component displays a check-in start card on a video playback screen, and wherein the complete check-in time is a time when the target check-in component displays a check-in end card on the video playback screen; and
    creating the target check-in component based on the check-in information.

8. The method according to claim 7, wherein when the user selects the series-video check-in component as the target check-in component, the method further comprises:
    displaying a series-video creation screen in response to a series check-in video creation request triggered by the user;
    obtaining series information set by the user based on the series-video creation screen, wherein the series information comprises a title for the series of videos and a quantity of periods of the series of videos; and
    creating a series of check-in videos based on the series information.

9. The method according to claim 8, further comprising:
    in response to detecting a new series check-in video creation request triggered by the user, determining whether there is a created series of check-in videos for which the series-video check-in components have not been fully added; and prohibiting creating the new series of check-in videos in response to determining that there is a created series of check-in videos for which the series-video check-in components have not been fully added.

10. The method according to claim 8, further comprising: deleting, in response to a deletion operation for the series of check-in videos triggered by the user, all target check-in components associated with the series of check-in videos.

11. The method according to claim 7, wherein when the selected check-in component is the single-video repeat check-in component, the check-in information further comprises at least one of a check-in period or a quantity of check-in times.

12. The method according to claim 6, further comprising:
displaying a check-in component modification screen based on a modification operation triggered by the user through the target check-in component;
obtaining modified check-in information obtained by the user through the check-in component modification screen; and
updating the target check-in component based on the modified check-in information.

13. The method according to claim 6, wherein the target check-in component comprises a start check-in component and an end check-in component, and wherein the method further comprises:
deleting the start check-in component and the end check-in component in response to a deletion operation triggered by the user through the start check-in component.

14. A computer device, comprising:
a processor; and
a memory, wherein the memory stores computer executable instructions that, when executed by the processor, cause the processor to perform the method according to claim 6.

15. A non-transitory computer-readable storage medium storing computer instructions that, when executed by a processor, cause the processor to perform the method according to claim 6.

16. A computer device, comprising:
a processor; and
a memory, wherein the memory stores computer executable instructions that, when executed by the processor, cause the processor to:
detect whether a playback progress of a video reaches a preset first playback progress;
in response to detecting that the playback progress of the video reaches the preset first playback progress, display, based on a video type of the video, a check-in start card corresponding to the video type, wherein the check-in start card comprises a check-in button;
in response to detecting that the playback progress of the video reaches a preset second playback progress display a check-in end card on the video playback screen; and
display a check-in success card on a video playback screen in response to a check-in operation triggered by a user through the check-in button,
wherein a check-in component name, a check-in completion degree of the user and a check-in progress ranking of the user are displayed on the check-in success card, and a check-in end copy, the check-in progress ranking of the user, and a button to view a check-in record of the user are displayed on the check-in end card.

* * * * *